Sept. 26, 1972    H. PFLEGER    3,694,148
PROCESS OF MAKING AMMONIUM RHODANIDE (NH₄SCN)
Filed Aug. 13, 1969
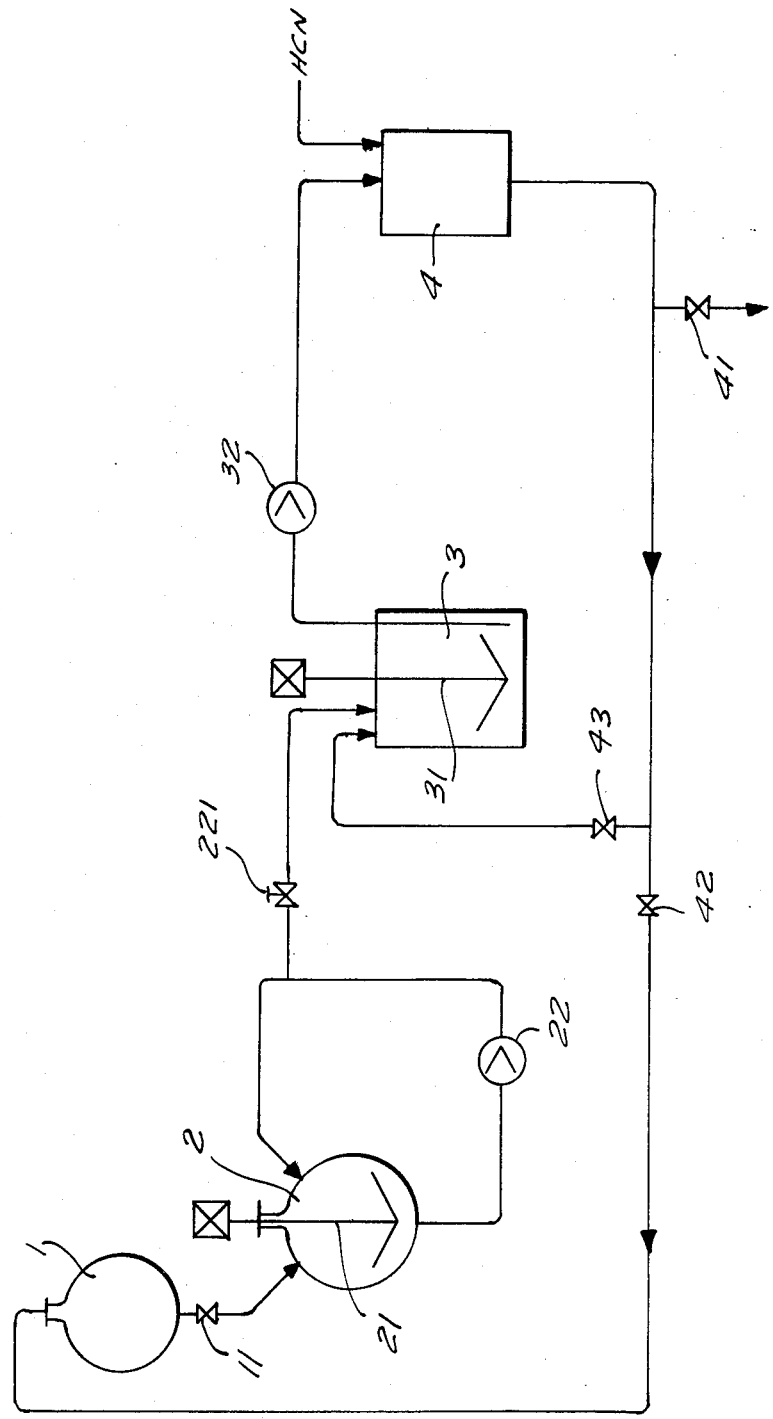
INVENTOR
HANS PFLEGER
BY
ATTORNEY

United States Patent Office 3,694,148
Patented Sept. 26, 1972

3,694,148
PROCESS OF MAKING AMMONIUM
RHODANIDE (NH₄SCN)
Hans Pfleger, Neu-Isenburg, Germany, assignor to
Deutsche Gold- und Silber-Scheideanstalt vormals
Roessler, Frankfurt am Main, Germany
Filed Aug. 13, 1969, Ser. No. 849,631
Claims priority, application Germany, Aug. 14, 1968,
P 17 92 279.1
Int. Cl. C01c 3/00, 1/00; C01b 21/54
U.S. Cl. 423—366    3 Claims

ABSTRACT OF THE DISCLOSURE

Ammonium rhodanide (NH₄SCN) is made by reacting anhydrous ammonia, anhydrous hydrogen cyanide and sulfur in a medium comprising a solution of ammonium rhodanide (NH₄SCN) in anhydrous ammonia and containing ammonium polysulfide.

BACKGROUND OF THE INVENTION

Rhodanides are important materials used in the polymerization of acrylonitrile, in the manufacture of fibers from polyacrylonitrile, as aids in the textile industry and as pesticides.

The usual process of making ammonium rhodanide involves reacting carbon disulfide and ammonia as shown in the following equation

$$CS_2 + 2NH_3 \rightarrow NH_4SCN + H_2S \qquad (I)$$

Another process involves reacting hydrocyanic acid, ammonia and polysulfide sulfur in an aqueous medium as shown in the next equation:

$$HCN + NH_3 + (NH_4)_2S_x \rightarrow NH_4SCN + (NH_4)_2S_{x-1} \qquad (II)$$

$x$ means a number between 2 and 5. The raw materials for this latter process are usually obtained from coke oven gases where hydrocyanic acid and ammonia are present in small concentration.

These processes however has various shortcomings for industrial production. In the first place, by-products are easily formed. In the second place, the necessity to evaporate a large amount of water makes the process rather laborious and expensive.

Another process has been proposed to avoid these difficulties. In this process ammonium rhodanide is formed from aqueous ammonia, aqueous hydrocyanic acid and sulfur in a reaction medium consisting of a solution of ammonium rhodanide in aqueous ammonia. This process unfortunately has the drawback that it requires a comparatively long reaction time, such as 2 to 3 hours, at a yield of only about 80%, which is caused by the low solubility of sulfur.

The invention therefore has the object to avoid these shortcomings of presently known processes.

SUMMARY OF THE INVENTION

The invention resides in a process comprising the step of reacting substantially anhydrous ammonia, substantially anhydrous hydrogen cyanide and sulfur in a medium comprising a solution of ammonium rhodanide in substantially anhydrous ammonia and containing ammonium polysulfide.

The invention also embraces a continuous process for making the ammonium rhodanide which comprises continuously adding hydrogen cyanide, sulfur and ammonia to a solution of ammonium rhodanide, ammonia and ammonium polysulfide, permitting the components to react, continuously withdrawing a portion of the solution corresponding to the amount of ammonium rhodanide formed in said reaction while continuously recycling the remaining portion of the solution, continuously separating the ammonia and hydrogen sulfide present in said withdrawn portion of the solution from the formed solid ammonium rhodanide and continuously recovering the ammonium rhodanide while recycling the ammonia and hydrogen sulfide.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single figure shows in diagrammatic manner an apparatus for use in the continuous operation of the method of the invention.

DESCRIPTION OF THE PREFERRED EMBODIMENTS

A feature of the invention resides in the fact that the reaction is carried out in a reaction medium wherein there is present ammonium polysulfide. This is based on the finding that the speed of the reaction between sulfur and anhydrous ammonia and anhydrous hydrogen cyanide can be increased substantially by adding a certain amount of hydrogen sulfide to the solution of ammonium rhodanide in anhydrous ammonia which constitutes the reaction medium. This increase in reaction speed is due to the formation of ammonium polysulfide. Thus, the reaction proceeds rapidly and practically without formation of any by-products resulting in yields of above 95% of ammonium rhodanide since the sulfur in the form of ammonium polysulfide is present in a highly reactive form. The high reaction speed is of particular interest where the process is operated on a continuous basis.

Liquid ammonia is an excellent solvent for ammonium rhodanide. For instance, a solution that is saturated at 20° C. may contain about 78% by weight of NH₄SCN. The NH₃ vapor pressure of this solution is only 237 mm. Hg. Thus, ammonium polysulfide can be formed in this nonaqueous solution from hydrogen sulfide and sulfur and the ammonium polysulfide then will easily react with hydrogen cyanide and ammonia upon formation of ammonium rhodanide.

By recycling the base solution consisting of ammonium rhodanide, ammonia and ammonium polysulfide, it is possible to produce a comparatively large amount of ammonium rhodanide by continuous addition of ammonia, hydrogen cyanide and sulfur while employing a comparatively small amount of ammonium sulfide.

In the industrial practice of the process, it makes no difference that a small amount of water may for instance be entrained from the atmosphere. This will have no undesirable effect on the reaction.

At normal pressure the temperature of the reaction may be anywhere between 0 and 70° C. If the pressure is increased in order to avoid loss of hydrogen cyanide, ammonia and hydrogen sulfide, an increase in the reaction temperature is possible.

Ammonia and hydrogen sulfide are removed from the reaction solution by evaporation. There then remains ammonium rhodanide which will contain only small amounts of sulfur and which can be purified by recrystallization or can be converted to other rhodanides, for instance to sodium rhodanide by reaction with sodium hydroxide.

If the process is practiced on a continuous basis, for which it is particularly suited, part of the reaction solution can be withdrawn for fresh solution of sulfur and subsequent reaction with hydrogen cyanide in the presence of ammonia. Another part corresponding to the formed amount of rhodanide may be subjected to further separation. The ammonia and hydrogen sulfide which result from the evaporation can also be recycled.

The ammonia and hydrogen cyanide can be added to the reaction medium both in gaseous and in liquid form.

The following examples will further illustrate the invention.

Example 1

A solution consisting of

|  | G. |
|---|---|
| $NH_4SCN$ | 200 |
| $NH_3$ | 70 |
| $H_2S$ | 8 | was placed in a flask equipped with a stirrer, a dropping funnel, a thermometer, a cooling device and a gas inlet. 64 g. of sulfur were then added to this solution while stirring. A partial solution of the sulfur occurred. During a time of 20 minutes, there were then dropwise added 53 g. of hydrogen cyanide upon cooling by ice and introduction of ammonia. During this step the temperature increased to about 50 to 55° C. Further sulfur went into solution in amounts corresponding to the reaction between the polysulfide sulfur with the hydrocyanic acid. Stirring was then continued for another 10 minutes and the ammonia and hydrogen sulfide were finally removed by evaporation.

There was left 98.7% ammonium rhodanide. The balance consisted of non-reacted sulfur which could be removed easily by simple recrystallization. The final yield was 98.5% relative to the hydrogen cyanide employed in the reaction.

Example 2

32 g. of sulfur were dissolved in a solution consisting of

|  | G. |
|---|---|
| $NH_4SCN$ | 360 |
| $NH_3$ | 120 |
| $H_2S$ | 9 | which had been placed in the same apparatus as used in Example 1. During a period of 7 minutes, there were then dropwise 25.5 g. hydrogen cyanide to the solution upon cooling by ice and introduction of ammonia. The temperature in this step rose to 35° C. After an additional 10 minutes, the solution was analyzed. It now contained 430 g. ammonium rhoanide which corresponded to a new formation of 70 g., that is a yield of 97.5% relative to the employed hydrogen cyanide.

Example 3

This example illustrates a continuously operated process. Reference is made to the attached drawing.

As appears, a supply vessel 1 is provided for the base or work solution containing $NH_4SCN+NH_3+$ some ammonium polysulfide. The supply vessel communicated through a valve 11 with a suspension tank 2 for the sulfur. A stirrer 21 was provided for a thorough mixing of the suspension, that is, the concentrated suspension of sulfur in the base solution.

The suspension tank 2 was connected by a pump 22 and through a dosing device 221 with a solution tank 3 which in turn was equipped with a stirrer 31. The solution tank 3 was connected by a duct and a pump 32 to the reaction vessel 4. The latter in turn had a connection with the solution tank 3 by means of a feedback line which included a valve 43 and a similar connection with the supply vessel 1 via a valve 42.

The operation of the device was as follows:

The pump 32 conveyed the base solution from the solution tank 3 to the reaction vessel 4. In addition a predetermined dose of hydroegn cyanide was passed into the reaction vessel. The ammonia required in the reaction could either be introduced into the solution tank 3 or could be introduced at any other desired place, for instance directly into the reaction vessel 4. In accordance with the amounts of rhodanide formed during the reaction, part of the solution was removed through an outlet 41. However, if the device was intended for large-scale operation, it would be preferable to continuously remove ammonia and hydrogen sulfide by evaporation and recycling them while retaining the rhodanide.

The remaining portion of the base solution was permitted to flow back into the solution tank 3 or was channeled into the supply vessel 1 for preparation of fresh sulfur suspension.

The dosing of the sulfur into the solution vessel 3 was effected in the form of a concentrated suspension of the sulfur in the base solution. For instance, 500 g. of sulfur were contained per liter of suspension.

The suspension was continuously agitated by a stirrer 21 and the pump 22 and was passed into the solution tank 3 in accordance with the amounts of hydrogen cyanide added in the reaction vessel 4.

With this kind of apparatus, it was possible, in operating on a small laboratory scale, to form 1 kg. of ammonium rhodanide in 1 hour by recycling 2.0 liters of base solution. This corresponded to a 96% yield relative to the amount of hydrogen cyanide employed. After separating the ammonia and the hydrogen sulfide, there remained only a minor amount of sulfur in the ammonium rhodanide which latter could be obtained in perfectly pure form by recrystallization from water.

Apart from its simplicity and the rapid formation of ammonium rhodanide free of by-products, the advantage of this process is mainly in the economical way of separating the ammonium rhodanide from a concentrated reaction solution.

The process of the invention in addition permits to keep the amount of hydrogen sulfide necessary for dissolving the sulfur at a low level relative to the amount of rhodanide produced because of the continuous circulation system.

I claim:

1. A continuous process for obtaining ammonium rhodanide comprising the steps of continuously adding substantially anhydrous hydrogen cyanide, sulfur and substantially anhydrous ammonia to a solution of substantially anhydrous ammonium rhodanide, ammonia and ammonium polysulfide, permitting the components to react, continuously withdrawing a portion of the solution corresponding to the amount of ammonium rhodanide formed in said reaction while continuously recycling the remaining portion of the solution back into the initial reaction, continuously separating the ammonia and hydrogen sulfide present in said withdrawn portion of the solution from the formed solid ammonium rhodanide and continuously recovering the ammonium rhodanide while recycling the ammonia and hydrogen sulfide into the solution of ammonium rhodanide and ammonium polysulfide, the reaction being carried out at atmospheric pressure and a temperature between 0 and 70° C.

2. The process of claim 1, wherein first sulfur is at least partially dissolved in ammonium rhodanide, substantially anhydrous ammonia and substantially anhydrous hydrogen sulfide followed by adding substantially anhydrous hydrogen cyanide and additional ammonia to the solution while stirring.

3. The process of claim 2, wherein the addition of ammonia and hydrogen cyanide is effected while cooling the solution whereupon, after formation of sufficient ammonium polysulfide, the ammonia and hydrogen sulfide are removed by evaporation.

References Cited

UNITED STATES PATENTS

| 2,678,871 | 5/1954 | Russell | 23—75 |
| 2,894,815 | 7/1959 | Rolingson | 23—75 |

OSCAR R. VERTIZ, Primary Examiner

H. S. MILLER, Assistant Examiner

U.S. Cl. X.R.

423—562